United States Patent Office 3,555,406
Patented Jan. 12, 1971

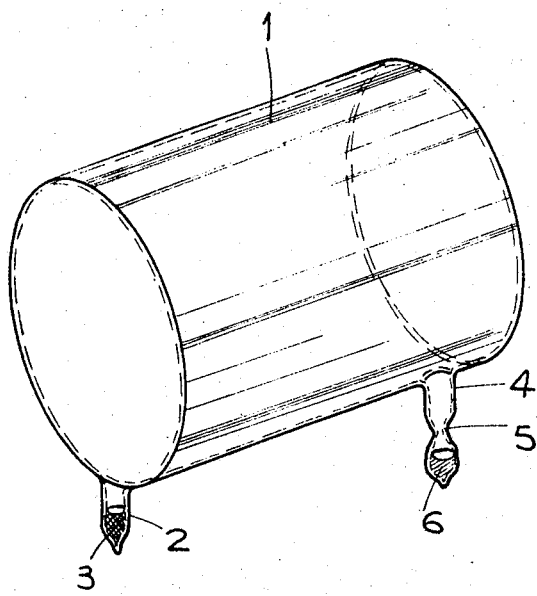

3,555,406
OPTICAL RESONANCE CELLS
Henri Brun, Paris, France, assignor to CSF-Compagnie Generale de Telegraphie Sans Fil, a corporation of France
Filed Oct. 3, 1968, Ser. No. 764,898
Claims priority, application France, Oct. 26, 1967, 126,033
Int. Cl. G01r 33/08
U.S. Cl. 324—.5
4 Claims

ABSTRACT OF THE DISCLOSURE

An optical resonance cell which comprises a bulb communicating with the body of the cell and containing a finely divided metal powder which, by adsorption, retains the metal whose saturating vapour phase is to be optically pumped.

---

The present invention relates to optical resonance cells which can be used, for example, in atomic clocks or in optically pumped magnetometers.

Cells available at the present time can be operated only at rather low optimum temperatures. These cells cannot operate unless the density of the saturating vapour is at an optimum level; if the vapour density in the cell is too low, too few atoms are involved in the mechanism of optical pumping and resonance, and the resonance signal disappears. On the other hand, if the vapour density were to be too high, there would be too high a degree of absorption of the pumping light wave, due to the fact that, because of the relaxation phenomenon, the atoms of a vapour are never all orientated in the same way and the output signal reaching the optical detector would thus be too weak.

The optimum temperature of operation of a resonance cell is, for example, 35° C. for caesium vapour and 45° C. for rubidium vapour. Temperature regulation in cells of this kind when operated in environments with higher temperature, requires the use of thermoelectric elements (such as frigatrons) which take a relatively large amount of power.

One solution has already been put forward with a view to avoiding the need to use such elements. A specific compound of carbon and alkali metal is used so that a suitable alkali vapour pressure can be achieved by heating the compound to a temperature in the order of 300° C. or more. However, this approach has the drawback that it is necessary to heat a part of the resonance cell to 300° C. and this may be a problem in so far as stability of the system, into which the cell is incorporated, is concerned, due to the development of convection currents in the buffer gas employed.

It is an object of the invention to overcome the drawbacks of the aforestated solution and to provide a resonance cell, the temperature regulation of which is simple to effect in all conditions of operation normally encountered, without requiring a large power consumption.

According to the invention there is provided an optical resonance cell comprising a transparent hollow body, within said hollow body a metal powder and alkali metal adsorbed by said powder.

The invention also relates to a process for manufacturing such a cell.

For a better understanding of the invention and to show how the same may be carried into effect, reference will be made to the drawing accompanying the ensuing description and the only figure of which shows an embodiment of a cell according to the present invention in the course of its manufacture.

In this figure, a cell 1 has been illustrated comprising a transparent body and a bulb 2 communicating with the body of the cell and containing finely divided metal powder 3. A second bulb 4 which communicates with the body of the cell through a restricted portion 5, contains alkali metal 6 the vapour of which is to be optically pumped.

The finely divided metal powder is, for example, tungsten powder with a 5 micron grain size and the alkali metal is, for example, rubidium.

The bulbs 2 and 6 are heated to the optimum temperature of operation of the cell ( for example 45° C. in the case of rubidium) and the cell wall at a slightly higher temperature in order to prevent any condensation of the alkali vapour thereupon. The cell is maintained in this condition for a sufficient time to allow the metal powder to adsorb the alkali vapour, for example during 200 hours. The bulb 6 is then cut at the restriction 5 while the latter is sealed off.

The alkali vapour pressure then prevailing in the cell is substantially constant and is virtually independent of the temperature, at least in the effective temperature range, say between 45° and 80° C. approximately. The cell system can thus be heated to 80° C. without modifying the optimum alkali vapour pressure for operation of the cell.

The advantages of a cell of this kind are obvious:

It can operate at a sufficiently high temperature to eliminate any need for cooling devices which require substantial amount of power. This is achieved without it being necessary to heat a specific part of the cell more than others (something which is the case in conventional cells which utilise a compound of carbon and alkali metal) so that systems employing the cell of the invention have a higher stability. Also the regulation of the temperature need not be very precise since the vapour pressure inside the cell is virtually independent of temperature within the operating temperature range.

Of course, the invention is not limited to the embodiments described and shown which were given solely by way of example.

What is claimed is:

1. A resonance cell for optical pumping systems comprising; a sealed, hollow vessel made of an optically transparent material, a quantity of finely divided metal powder placed within said vessel and an alkali metal within said vessel and adsorbed by said powder whereby the alkali metal vapour pressure within said vessel is substantially constant over a range of operating temperatures of said cell.

2. A resonance cell as claimed in claim 1, wherein said vessel comprises a bulb within which said metal powder and said alkali metal are located.

3. A cell as claimed in claim 1, wherein said powder is a tungsten powder.

4. A cell as claimed in claim 3, wherein said alkali metal is rubidium.

References Cited
UNITED STATES PATENTS 3,242,423   3/1966   Malnar _____ 324—0.5
3,281,709   10/1966  Dehmelt _____ 324—0.5

MICHAEL J. LYNCH, Primary Examiner

U.S. Cl. X.R.

313—174